3,010,336
GEAR MECHANISM
Samuel E. Adair, Shorewood, and Ellwood A. Fox, Milwaukee, Wis., assignors to General Motors Corporation, Detroit, Mich., a corporation of Delaware
Filed Oct. 21, 1957, Ser. No. 691,412
13 Claims. (Cl. 74—394)

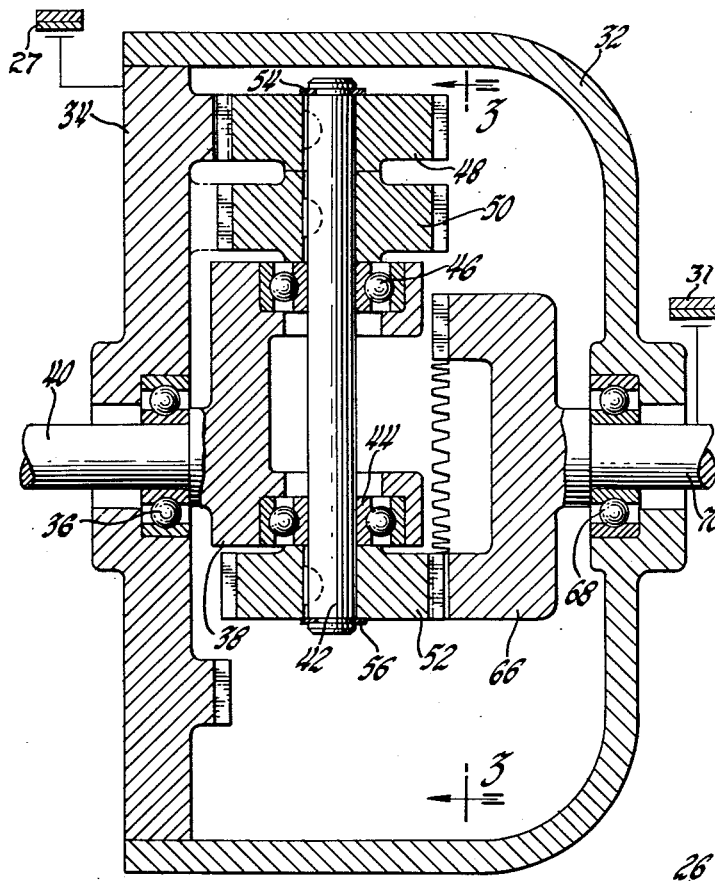

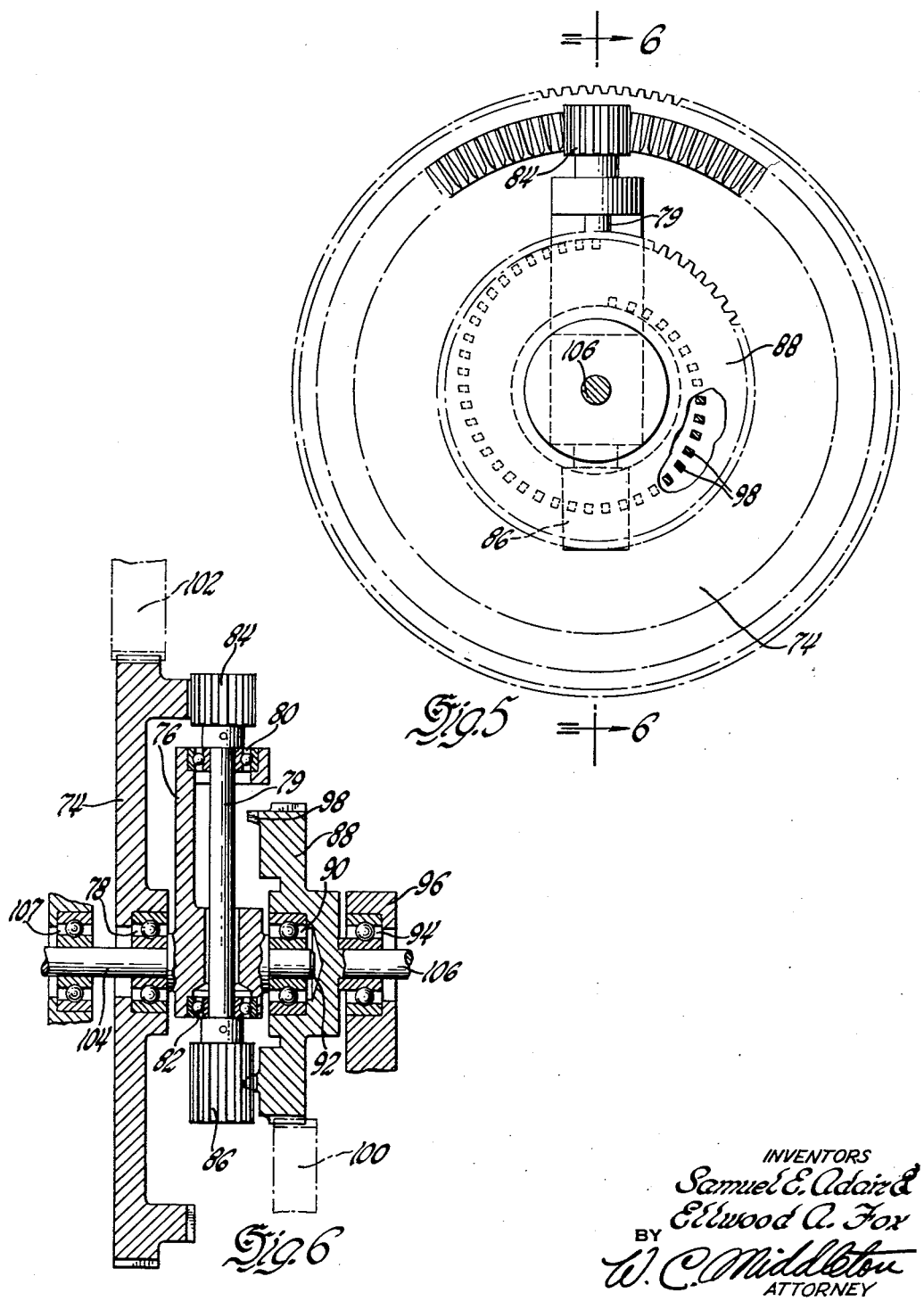

This invention relates to motion and power transmitting mechanisms and particularly to mechanisms of the gear type.

The requirements of these gear mechanisms for light load applications, e.g., computers and other type calculating devices, are somewhat diverse, as compared to conventional mechanisms. For instance, a speed reducer must generally provide large reduction ratios while a differential must generally add or subtract angles. Also, frequently, drive is expected to be intermittent and/or, because of the computer aspect, at some constantly varying ratio. In addition, the permissive spaces for such mechanisms are limited and, therefore, the mechanism must be compact and easily assembled but still inexpensive to manufacture.

With these considerations in mind, the present invention seeks to provide a gear mechanism that is compact structurally and easily assembled, that provides single or multiple large or small reduction ratios with a minimum of operating components, that may act as a differential, and that is easily adapted for diversified applications.

More particularly, the invention contemplates a gear mechanism that furnishes either intermittent and/or complex varying drive ratios of large or small reductions.

According to one form of the invention, a planet carrier and a pair of face or side gears are positioned on a common axis. The carrier has arms journaled thereon that extend radially in the plane of rotation of the carrier. Pinions are attached to each of the arms on opposite sides of the common axis and mesh with the confronting teeth on the side gears. Both of the side gears have teeth arranged to provide constant or varying drive ratios through the mechanism.

The foregoing and other objects and advantages will be apparent from the following description and from the accompanying drawings, in which:

FIGURE 1 is a diagrammatic illustration of a speed reducer gear mechanism according to one form of the invention;

FIGURE 2 is a sectional view of a modified speed reducer gear mechanism arranged to provide intermittent and variable drive ratios;

FIGURE 3 is a plan view along line 3—3 of the FIGURE 2 mechanism;

FIGURE 3a is a plan view of a variation of the FIGURE 2 modification;

FIGURE 4 is an enlarged fragmentary view of the teeth on the side gear elements;

FIGURE 5 is a plan view of the teeth on the side gear of a differential mechanism; and FIGURE 6 is a sectional view along line 6—6 of FIGURE 5.

Referring to FIGURE 1, a gear mechanism embodying the principles of the invention is illustrated diagrammatically comprising spaced and axially aligned side or face gears 10 and 12 and a coaxial carrier 14. Carrier 14 rotatably supports a radially extending cross shaft 16 on the opposite ends of which are attached pinions 18 and 20. Pinion 18 meshes with face gear 10 while pinion 20 meshes with face gear 12.

Each of the face gears mentioned herein, preferably, have teeth of the configuration similar to teeth 22 on face gear 10 depicted in FIGURE 4. Since it is desirable that the pinions 18 and 20 be of the spur type with involute shaped teeth, the teeth 22 are formed radially on the face of the gear 10 with the trailing edge 24 thicker than the leading edge 26 so that the tooth has a tapered contour. Consequently, a proper meshing relationship is achieved between the teeth on the spur gear and the teeth 26 on the gear 10 and, of course, by using spur tooth pinions the cost of the mechanism is greatly reduced.

To best explain the operation of the FIGURE 1 mechanism, assume that the face gear 10 is grounded or otherwise held against rotation as by a brake 27, that the carrier 14 is connected to an input shaft 28, and that the face gear 12 is connected to an output shaft 30. With this arrangement a very large reduction ratio is possible which can be demonstrated by selecting tooth numbers and inserting them in the appropriate equation:

$$R = 1 - \frac{N_1 N_3}{N_2 N_4}$$

where R is the reduction ratio and $N_1$, $N_2$, $N_3$ and $N_4$ represent, respectively, the number of teeth on the gear 10, pinion 18, pinion 20, and the gear 12. By substituting arbitrarily selected numbers of teeth in the equation as follows:

$$R = 1 - \frac{99 \times 28}{40 \times 70} = 1 - \frac{99}{100} = \frac{1}{100}$$

a reduction ratio of 100:1 is obtained which means that the output shaft 30 will revolve once while the input shaft 28 revolves 100 times. Inasmuch as the pinions 18 and 20 are positioned on opposite sides of the rotational axis defined by shafts 28 and 30, the shaft 30 will rotate in the same direction as the shaft 28. Simply by making slight changes in the number of teeth, relative rotation between input shaft 28 and output shaft 30 can be altered. For instance, if gear 10 has 100 teeth instead of 99 and remains fixed, the ratio becomes $$R = 1 - \frac{100 \times 28}{70 \times 40} = 0$$

or with continuous input, the output will be zero. By increasing the number of teeth on gear 10 to 101, the direction of rotation of the output shaft 30 can be reversed as indicated by the equation $$R = 1 - \frac{101 \times 28}{40 \times 70} = 1 - \frac{101}{100} = -\frac{1}{100}$$

As will become apparent in the description of the FIGURES 2 and 3 mechanism, back and forth or reciprocating motions of output with the input turning in one direction, are possible.

To further demonstrate the versatility of the mechanism in FIGURE 1, if gear 12 is held, as by a brake 31, and gear 10 becomes the output, then, with the tooth numbers denoted, the ratio will be $$R = 1 - \frac{N_2 N_4}{N_1 N_3} = 1 - \frac{40 \times 70}{99 \times 28} = -\frac{1}{99}$$

In other words when the input shaft 28 revolves 99 times, output gear 10 would turn once in an opposite direction. If gears 10 and 12 are appropriately arranged to be driven and gear 10 is not fixed the mechanism can become a differential with the possible inputs at 28, 10 or 12. If input shaft 28 is held and gear 10 is revolved, the ratio to the output shaft 30 would be $$R = \frac{N_1 N_3}{N_2 N_4}$$

which by substituting the tooth numbers is $$R = \frac{99 \times 28}{40 \times 70} = \frac{99}{100}$$

or for 99 turns of the input 10, the output 12 would turn 100 times.

In FIGURES 2 and 3, a mechanism similar to that in FIGURE 1 has been modified to provide an intermittent and variable ratio drive. The mechanism is housed within a casing 32 and fixedly supports a face gear 34 which, in turn, through a bearing 36 rotatably supports a carrier 38 integral with or otherwise connected to a shaft 40. A cross shaft 42, journaled on the carrier 38 by spaced bearings 44 and 46, has suitably secured to the upper end pinions 48 and 50 and to the lower end a pinion 52. If desired, these pinions 48, 50 and 52 may be made integral with shaft 42. Pinions 48 and 50 are axially positioned between the bearing 46 and a retaining ring 54 while the pinion 52 is axially positioned between the bearing 44 and another retaining ring 56. As shown in FIGURE 3, the face gear 34 has two spaced sectors of teeth 58 and 60 arranged on one operating diameter ring for meshing with the pinion 48 and another pair of spaced sectors of teeth 62 and 64 arranged on a smaller operating diameter ring for meshing with the pinion 50. A face gear 66, which is axially aligned with the carrier 38 and the face gear 34 and which is also journaled in the casing 32 by a bearing 68, has a continuous ring of teeth in mesh with pinion 52. The face gear 66 may be attached to or made integral with a shaft 70.

With the face gear 34 fixed by a brake, e.g., brake 27 in the same way as gear 10 in FIGURE 1, and assuming that shaft 40 is the input and the shaft 70 is the output for the mechanism in FIGURES 2 and 3, rotation of the carrier 38 will, through the pinions 48, 50 and 52, drive the face gear 66. The reduction ratio for this mechanism, because of the arrangement of the gear teeth on the face of the gear 34, is variable for, when the teeth of pinion 48 rotate out of engagement with the teeth of sector 58, the teeth of pinion 50 will engage the teeth of either section 62 or 64 depending on the direction of rotation. With continued rotation, the teeth of pinion 48 will engage the teeth of sector 60. As a result, the output shaft 70 is first driven at one rate due to the engagement of the pinion 48 with the sector 58 and subsequently, at another rate with the pinion 50 engaging either the sections 62 or 64. These rates, as mentioned in the explanation of the FIGURE 1 mechanism, will be determined by the equations from the relation of tooth numbers. Accordingly, the output shaft 70 can be stopped for an intermittent drive or reciprocated, i.e., driven forwards then backwards, as different sectors are engaged for any interval desired. It should be kept in mind that as with the FIGURE 1 embodiment, the shaft 70 may be held by a brake such as brake 31 and the face gear 34 then may become the output. Furthermore, sectors may be cut on the faces of both face gears to furnish many kinds of output shaft motion. For example, note face gear 66' in FIGURE 3a. Face gear 66' has sectors 67' and 67" of different numbers of teeth and on different diameters and may be substituted for face gear 66. Also, face gear 66 may be held and gear 34 utilized as an output as explained in the description of the FIGURE 1 embodiment.

FIGURES 5 and 6 illustrate a differential mechanism having several versatile features and which provides another type output motion. In this differential a face gear 74 is journaled on a carrier 76 by a bearing 78. A cross shaft 79 is rotatably mounted by bearings 80 and 82 on the carrier 76 and has attached at the opposite ends thereof pinions 84 and 86. Pinion 84 meshes with face gear 74 while pinion 86 meshes with a face gear 88. Face gear 88 is revolvably supported on one side by a bearing 90 mounted on an extension 92 of the carrier 76 and on the opposite side by another bearing 94 enclosed in a support member 96. As best shown in FIGURE 5, the face gear 88 has a series of teeth 98 arranged in a spiral on the face of the gear.

With reference to FIGURE 5, face gear 88 may have external teeth formed thereon for engagement with a gear 100 and face gear 74 may have external teeth for engagement with a gear 102. Also, the carrier 76 and the face gear 88 may have shaft extensions 104 and 106 with extension 104 supported by a bearing 107. Therefore, many combinations of inputs and outputs are possible since the gears 100 and 102 and the shaft extensions 104 and 106 may each function as either an input or output for the mechanism. The only limitation, of course, would be that there must be at least one input and one output. However, for demonstration purposes, assume that the gear 102 is stationary and as a result, the face gear 74 will be restrained from rotation. Then, with a single input, e.g., shaft extension 104, driving, the face gear 88 will be rotated in the same or opposite direction depending on the ratios determined by the tooth proportions. If the operation is such that the teeth of the pinion 86 are engaging the teeth 98 at the inside of the spiral and the engagement continues outwardly, the speed of the face gear 88 will progressively decrease relative to the speed of the input 104. Conversely, if the pinion 86 commences engagement with the teeth 98 at the outer end of the spiral and continue inwardly the face gear 88 will increase in speed relative to the input 104.

From the foregoing, it can be seen that by the invention a versatile mechanism is provided which has an unlimited number of drive ratio possibilities, intermittent motion, back and forth motion of output with constant input, etc., which are especially advantageous for complex computer applications. Furthermore, by utilizing face gears of the kind described herein, large reduction ratios are feasible with a compact unit.

We claim:

1. In a gear mechanism, a planet carrier element having journaled thereon a shaft extending radially in the plane of rotation of the carrier element, a spur tooth pinion attached to each end of the shaft on opposite sides of the carrier element rotational axis, and spaced side gear elements coaxial with the carrier element and including teeth thereon disposed in confronting relation with the teeth on one side gear element meshing with one pinion and the teeth on the other side gear element meshing with the opposite pinion, the teeth on said one of the side gear elements being arranged on different operating diameters so that with one of the elements performing as an input, another of the elements performing as an output for the mechanism, and still another of the elements having the rotation thereof resisted, varied output motions relative to input are produced for each revolution of input as the teeth on the different operating diameters mesh with said one pinion.

2. In a gear mechanism, a planet carrier element having journaled thereon a shaft extending radially in the plane of rotation of the carrier element, a pinion attached to each end of the shaft on opposite sides of the carrier element rotational axis, and spaced side gear elements coaxial with the carrier element and arranged so that each side gear element engages a different pinion, each side gear element having sections of teeth arranged on different diameters so that with one of the elements performing as an input, another of the elements as an output for the mechanism, and still another of the elements having the rotation thereof resisted, varied output motions relative to input are produced for each revolution of input as the sectors of teeth on the different diameters mesh with the associated pinion.

3. In a gear mechanism, an input carrier having journaled thereon a shaft extending radially in the plane of rotation of the carrier, a reaction side gear and output side gear located on a common axis with the carrier, a pair of pinions attached to the shaft on one side of the common axis and another pinion attached to the shaft on the opposite side of the common axis, the output side gear having alternately spaced sectors of teeth thereon arranged on different diameters, each of the pair of pinions meshing at different times with the spaced sectors on one diameter and the spaced sectors on the other diameter, said another pinion meshing with the reaction gear, the drive ratio R through the mechanism being determined by the equation $$R = 1 - \frac{N_1 N_3}{N_2 N_4}$$

where $N_1$ and $N_2$ represent, respectively, the number of teeth on the reaction side gear and the pinion meshing therewith and $N_4$ and $N_3$ represent, respectively, the number of sector teeth in a complete diameter on the output side gear and the meshing pinion in effect at a given time.

4. In a gear mechanism, a planet carrier element having journaled thereon a shaft extending radially in the plane of rotation of the carrier element, a pinion attached to each end of the shaft, and spaced side gear elements coaxial with the carrier element and including teeth thereon disposed in confronting relation with the teeth on one side gear element meshing with one pinion and the teeth on the other side gear element meshing with a different pinion, the teeth on one of the side gear elements being so arranged as to have different operating diameters so that the tooth number proportions between the meshing teeth on the pinions and the side gear elements effective to determine the drive ratio through the mechanism at any time vary such that with one of the elements performing as an input, another of the elements as an output for the mechanism, and still another of the elements having the rotation thereof resisted, varied output motions relative to input are produced for each revolution of input as the teeth on the different operating diameters mesh with the associated pinion.

5. In a gear mechanism, a planet carrier element having journaled thereon a shaft extending radially in the plane of rotation of the carrier element, a pinion attached to each end of the shaft, and spaced side gear elements coaxial with the carrier element and including teeth thereon disposed in confronting relation with the teeth on one side gear element meshing with one pinion and the teeth on the other side gear element meshing with another pinion, the teeth on one of the side gear elements being so arranged as to have different operating diameters so that the tooth number proportions between the meshing teeth on the pinions and the side gear elements effective to determine the drive ratio through the mechanism at any time are such that an intermittent drive through the mechanism is afforded as the teeth on the different operating diameters mesh with the associated pinion with one of the elements performing as an input, another of the elements as an output for the mechanism, and still another of the elements having the rotation thereof resisted.

6. In a gear mechanism, a planet carrier element having journaled thereon a shaft extending radially in a plane of rotation of the carrier element, a pinion atached to each end of the shaft, and spaced side gear elements coaxial with the carrier element and including teeth thereon disposed in confronting relation with the teeth on one side gear element meshing with one pinion and the teeth on the other side gear element meshing with a different pinion, the teeth on one of the side gear elements being so arranged as to have different operating diameters so that the tooth number proportions between the meshing teeth on the pinions and the side gear elements effective to determine the drive ratio through the mechanism at any time vary such that a variable and intermittent drive through the mechanism is afforded as the teeth on the different operating diameters mesh with the associated pinion with one of the elements performing as an input, another of the elements as an output for the mechanism, and still another of the elements having the rotation thereof resisted.

7. In a gear mechanism, a planet carrier element having journaled thereon a shaft extending radially in a plane of rotation of the carrier element, a pinion attached to each end of the shaft, and spaced side gear elements coaxial with the carrier element and so arranged that each side gear element engages a different pinion, the meshing teeth between one side gear element and the associated pinion being so arranged to have different operating diameters so that the tooth number proportions between the meshing teeth on the pinions and the side gear elements effective to determine the drive ratio through the mechanism at any time with one of the elements performing as an input, another of the elements as an output, and still another of the elements having the rotation thereof resisted cause varied output motions relative to input to be produced for each revolution of input as the different operating diameters become effective, the drive ratio at any time being determined by the equation $$R = 1 - \frac{N_1 N_3}{N_2 N_4}$$

where $N_1$ and $N_2$ represent the tooth numbers, respectively, on one side gear element and meshing pinion and $N_4$ and $N_3$ represent the tooth numbers, respectively, on the other side gear element and meshing pinion.

8. In a gear mechanism, first and second axially spaced side gear elements including teeth thereon disposed in confronting relation, a carrier element having journaled thereon a shaft extending radially in the plane of rotation of the carrier element, the side gear elements and the carrier element being located on a common axis, a pair of pinions attached to the shaft on one side of the common axis, and another pinion attached to the shaft on the opposite side of the common axis, the first side gear element having alternately spaced sectors of teeth thereon arranged on different diameters, each of the pair of pinions being arranged so as to mesh with the teeth on one diameter of alternately spaced sectors, said another pinion meshing with the second side gear element, the tooth number proportions between the teeth on the pinions and the side gear elements in mesh at a given time and effective to determine the drive ratio through the mechanism with one element performing as an input, another of the elements as an output, and still another of the elements having the rotation thereof resisted, changing as different diameters of the sectors mesh with the associated pinion thereby providing a variable drive ratio through the mechanism.

9. In a gear mechanism, an input carrier having journaled thereon a shaft extending radially in the plane of rotation of the carrier, a side gear positioned on one side of the carrier and arranged so as to have the rotation thereof resisted, an output side gear positioned on the oppostie side of the carrier, the carrier and side gears having a common axis, and a pair of pinions each attached to the shaft on opposite sides of the common axis, one of the pinions meshing with the side gear having the rotation thereof resisted and the other with the output side gear, the side gears having teeth thereon disposed in confronting relation, the teeth on one of the side gears being so arranged as to have different operating diameter so that the tooth number proportions between the meshing teeth on the pinions and the side gears effective to determine the drive ratio through the mechanism at a given time vary such that varied output motions relative to input are produced for each revolution of input as the teeth on the different operating diameters mesh with the associated pinion.

10. In a gear mechanism, a planet carrier element having journaled thereon a shaft, a pinion attached to each end of the shaft on opposite sides of the carrier element rotational axis, and spaced side gear elements coaxial with the carrier element and including teeth thereon disposed in confronting relation with the teeth on one side gear element meshing with one pinion and the teeth on the other side gear element meshing with the opposite pinion, the meshing teeth between one side gear element and the associated pinion being arranged to have different operating diameters so that the tooth number proportions between the teeth on the pinions and the side gear elements in mesh at a certain time and effective to determine the drive ratio through the mechanism with one of the elements performing as an input, another of the elements performing as an output for the mechanism, and still another of the elements having the rotation thereof resisted, vary so as to alter motion of output relative to input for each revolution of input as the different operating diameters become effective.

11. In a gear mechanism, first and second axially spaced side gear elements including teeth thereon disposed in confronting relation, a carrier element having journaled thereon a shaft extending radially in the plane of rotation of the carrier element, the side gear elements and the carrier element being located on a common axis, a pair of pinions attached to the shaft on one side of the common axis, and another pinion attached to the shaft on the opposite side of the common axis, the first side gear element having alternately spaced sectors of teeth thereon arranged on different diameters, each of the pair of pinions meshing at different times with said alternately spaced sectors of teeth on one diameter and said alternately spaced sectors of teeth on the other diameter, said another pinion meshing with the second side gear element, the tooth number proportions between the teeth on the pinions and the side gear elements in mesh at a certain time and effective to determine the drive ratio through the mechanism with one element performing as an input, another of the elements as an output, and still another of the elements having the rotation thereof resisted, being arranged so as to provide varied output motions with a constant input.

12. In a gear mechanism, first and second axially spaced side gear elements including teeth thereon disposed in confronting relation, the teeth on the second side gear element being arranged in a spiral, a carrier element having journaled thereon a shaft extending radially in the plane of rotation of the carrier element, the side gear elements and the carrier element being located on a common axis, a pinion attached to the shaft on one side of the common axis and meshing with the first side gear element and another pinion attached to the shaft on the opposite side of the common axis and meshing with the second side gear element, the tooth number proportions between the meshing teeth on the pinions and the side gear elements effective to determine the drive ratio through the mechanism at a given time with one of the elements performing as an input, another of the elements as an output, and still another of the elements having the rotation thereof resisted, being such that the effective drive ratio is constantly changing thereby affording a variable drive ratio through the mechanism.

13. In a gear mechanism, a planet carrier element having journaled thereon a shaft extending radially in a plane of rotation of the carrier element, a pinion attached to each end of the shaft, and spaced side gear elements coaxial with the carrier element and arranged so that each side gear element engages a different pinion, one of the side gear elements having sectors of gear teeth thereon arranged on different diameters, the tooth number proportions between the sectors of gear teeth on said one of the side gear elements and the meshing pinion in effect at a certain time and between the teeth on the other side gear element and the pinion meshing therewith when one of the elements is performing as an input, another of the elements is performing as an output and still another of the elements has the rotation thereof resisted, vary while the input is being revolved in one direction thereby providing reciprocating motion of the output relative to the input.

References Cited in the file of this patent

UNITED STATES PATENTS

| 6,525 | Tanlin | June 12, 1849 |
| 2,534,376 | Russell | Dec. 19, 1950 |
| 2,559,619 | Henderson | July 10, 1951 |
| 2,567,585 | Wagenknecht et al. | Sept. 11, 1951 |
| 2,763,165 | Baschet | Sept. 18, 1956 |

FOREIGN PATENTS

| 14,154 | Great Britain | Sept. 30, 1914 |
| 179,700 | Great Britain | May 18, 1922 |
| 295,835 | Great Britain | Aug. 23, 1928 |

UNITED STATES PATENT OFFICE
CERTIFICATE OF CORRECTION

Patent No. 3,010,336                         November 28, 1961

Samuel E. Adair et al.

It is hereby certified that error appears in the above numbered patent requiring correction and that the said Letters Patent should read as corrected below.

Column 3, line 37, for "section" read -- sector --; same column 3, line 43, and column 4, line 59, for "sections", each occurrence, read -- sectors --; column 8, line 41, under the heading "FOREIGN PATENTS" for "14,154" read -- 14,153 --.

Signed and sealed this 8th day of May 1962.

(SEAL)
Attest:

ERNEST W. SWIDER
Attesting Officer

DAVID L. LADD
Commissioner of Patents